United States Patent [19]

Kokaji

[11] Patent Number: 5,210,546
[45] Date of Patent: May 11, 1993

[54] METHOD AND AN APPARATUS TO RECORD WITH PLURAL GRADATION FOR MAGNETIC PRINTING MACHINE

[75] Inventor: Norio Kokaji, Hino, Japan

[73] Assignee: Iwatsu Electric Co., Ltd., Tokyo, Japan

[21] Appl. No.: 793,826

[22] Filed: Nov. 18, 1991

[30] Foreign Application Priority Data

Nov. 22, 1990 [JP] Japan .................................. 2-315793

[51] Int. Cl.⁵ .............................................. G11B 9/00
[52] U.S. Cl. ..................... 346/74.2; 346/1.1; 358/301
[58] Field of Search ................. 346/74.2, 1.1; 358/301

[56] References Cited

U.S. PATENT DOCUMENTS

| | | | |
|---|---|---|---|
| 3,185,777 | 5/1965 | Rheinfrank | 346/74.2 |
| 4,060,811 | 11/1977 | Faucz | 346/74.2 |
| 4,163,979 | 8/1979 | Kokaji | 346/74.2 |

FOREIGN PATENT DOCUMENTS

56-33707  8/1981  Japan .
56-33708  8/1981  Japan .

*Primary Examiner*—Benjamin R. Fuller
*Assistant Examiner*—Randy W. Gibson
*Attorney, Agent, or Firm*—Paul and Paul

[57] ABSTRACT

In a magnetic printing machine including at least two recording frequency generators which generate at least two recording frequencies with close each other, a recording current applied to a recording head for the same gradation level is switched among at least two recording frequencies every time a predetermined number of pixels are recorded.

6 Claims, 7 Drawing Sheets

METHOD AND AN APPARATUS TO RECORD WITH PLURAL GRADATION FOR MAGNETIC PRINTING MACHINE

BACKGROUND OF THE INVENTION

1. Field of the Invention

The present invention relates to a recording method with plural gradation levels for a magnetic printing machine and apparatus in order to get a smooth gradation without using a high frequency clock pulse.

2. Description of the Related Art

The present inventor have suggested a recording method with plural gradation levels using modulation of a recording frequency (see U.S. Pat. No. 4,163,979).

In the suggested method, an image is recorded on a recording medium using a recording pulse train with a low frequency for a picture signal corresponding to a black pixel and increasing frequency proportional to the increase of brightness of a pixel.

Not only analog modulation, but also digital modulation can be used for a frequency modulating circuit. When using an analog circuit, a continuous gradation is obtained but poor stability may be caused by temperature change and/or electronic element deterioration. To solve the above problem, the present inventor have suggested a magnetic printing machine applying digital modulation with good stability.

Figure 7A:
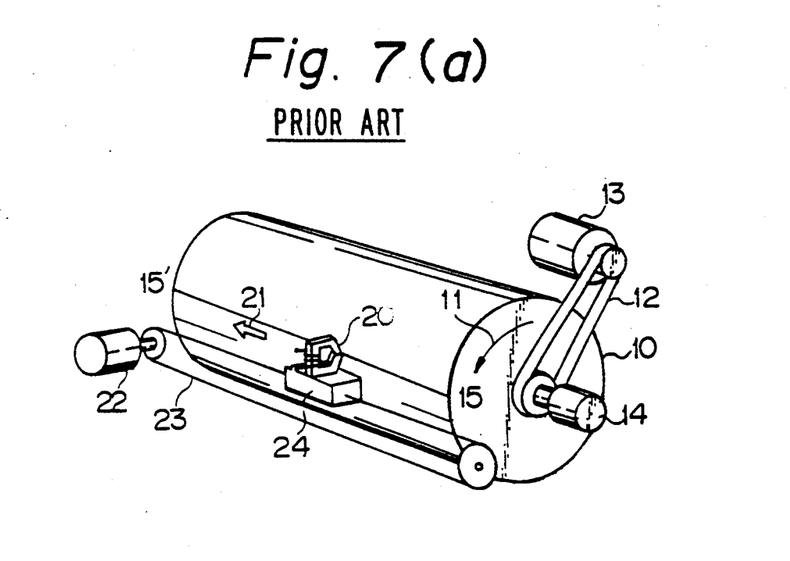
FIG. 7 is a view of a recording drum and a recording head of a magnetic printing machine.
Figure 7B:
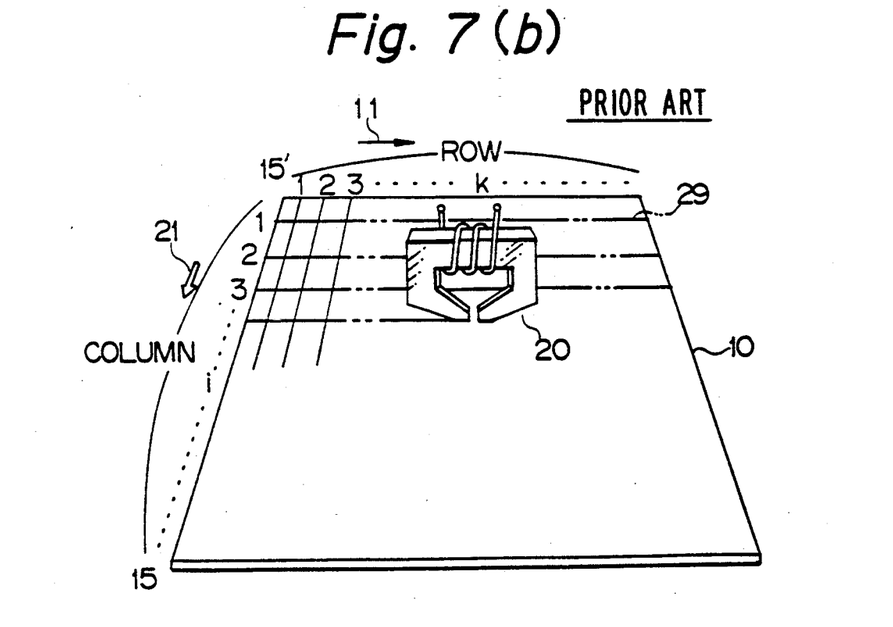

FIG. 7 shows one example of a digital magnetic printing machine. FIG. 7(a) shows a view of a recording drum 10 and a recording head 20, and FIG. 7(b) shows the development of the recording drum along a baseline 15—15'.

The recording drum 10 is driven in a direction shown by an arrow 11 by a drum motor 13 and a belt 12.

A rotary encoder 14 is directly connected to a shaft of the recording drum 10, and used for detection of a position of the recording head 20 from the baseline 15—15' and a rotating speed of the recording drum 10.

The recording head 20 is mounted on a carriage 24 driven by a head motor 22 and wire 23, and moved in a direction shown by an arrow 21.

A head position along the baseline 15—15' is detected by counting a number of drive pulses when a pulse-motor is applied as the head motor 22.

While the recording head 20 records a picture signal corresponding to one column along a circumference of the recording drum 10 on the recording drum 10, it is moved along the shaft of the recording drum 10, and records along a neighbouring circumference. By repeating the above operation, an image on one page is completed.

Figure 8:
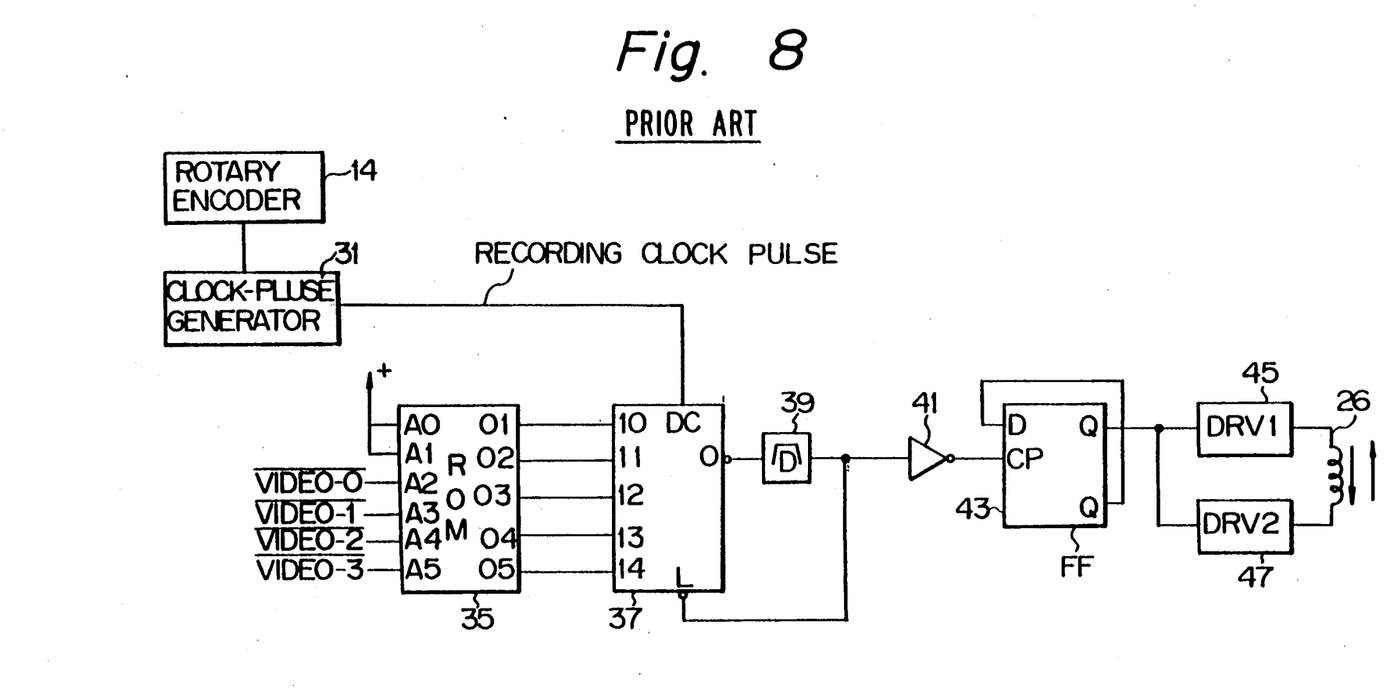
FIG. 8 is a diagram of a conventional frequency modulating circuit.

FIG. 8 shows a diagram of a frequency modulating circuit for the digital magnetic printing machine suggested by the present inventor.

A clock-pulse generator 31 generates clock-pulses synchronized with an output of the rotary encoder 14. These clock-pulses are applied to a decrement input terminal of a recording-pulse counter 37, and when every clock-pulse is input, a count value in the recording-pulse counter 37 is decremented.

An initial value for the recording-pulse counter 37 is set from a read only memory (ROM) 35 as follows.

For example, 4 bit picture code, that is, VIDEO 0–VIDEO 3 representing an original pixel in an original picture is applied to address terminals of ROM 35.

Memoried value corresponding to the address which is designated by the 4 bit picture code is set as the initial value for the recording-pulse counter 37.

An output signal of the recording-pulse counter 37 passes through a delay circuit 39, and is applied to an inverter 41 and a load terminal of the recording-pulse counter itself 37.

A count value of the recording-pulse counter 37 is decremented from the initial value which is determined by 4 bit picture code to zero when a clock-pulse is input, and the output of the recording-pulse counter 37 becomes zero when the count value reaches zero.

When the output of the recording-pulse counter 37 becomes zero, the initial value for the recording-pulse counter 37 is again read out from the ROM 35, because its output is fedback to its load terminal through the delay circuit 39.

Therefore, the output signal of the recording-pulse counter 37 keeps "1" logical level during the time which it is determined by (the initial value) x (the period of the recording clock-pulse), and turns to "0" logical level for a moment.

This output signal is applied to a flip-flop 43 through the inverter 41, and a pulse train having a period which is determined by (the initial value of the recording-pulse counter 37)×(the period of the recording clock-pulse)×2 and 50% duty ratio is got as the output of the flip-flop 43.

This pulse train is applied to a coil 26 of the recording head 20 after being amplified by two driver 45 and 47. Then an image is recorded on the recording drum 10 with a plural gradation level corresponding to a 4 bit picture signal.

In this case, $2^4=16$ gradation levels are obtained, because a 4 bit picture signal code is used.

Table 1 shows a picture signal code, initial values for the recording-pulse counter memoried in ROM 37, reset intervals when a period of the clock-pulse is determined as 100 ns, a period of the output pulse of the flip-flop 43 and reflection density of recorded pixels.

For example, if the brightness of one original pixel in an original picture is gray, and the picture signal code corresponding to the pixel "8", the output of ROM 35 becomes "10". Then the recording-pulse counter 37 is reset every $10 \times 100$ ns $= 1000$ ns $= 1$ $\mu$s. And pulse train having 2 $\mu$s period and 50% duty ratio is output from the flip-flop 43.

The reflection density of the recorded pixel is given as 0.74.

Figure 2:
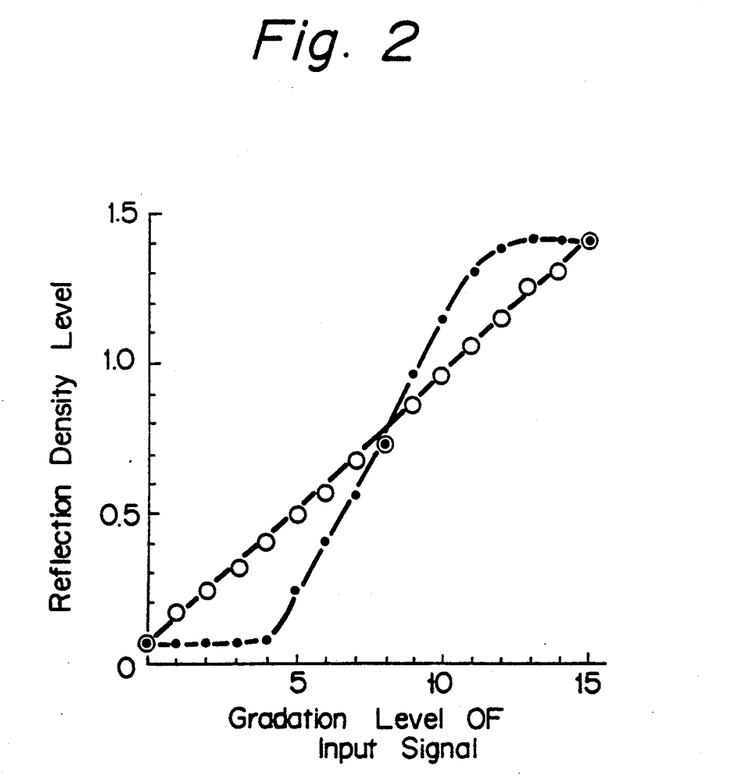
FIG. 2 is a graph of $\gamma$ characteristic.

FIG. 2 shows so-called γ-characteristic of the recorded pixels, and designates the γ-characteristic when using the conventional recording method. In this graph, the abscissa designates the gradation level of original pixels in the original print, and the ordinate designates the reflection density of the recorded pixels.

This graph shows that the recorded pixels have only 9 gradation levels even though 16 gradation levels are used for recording.

If the digital modulation is applied for the magnetic printing machine, it is difficult to get the same levels of gradation as levels of digitized frequencies because of the following reasons.

(1) A magnetic drum used as a recording medium has a nonlinear magnetization characteristic.

(2) As recording frequencies changes discretely, gradation levels change stepwise.

Though smooth gradation can be obtained by using a high frequency clock and increasing the number of selectable recording frequencies, expensive circuit elements are required and poor stability results due to the influence of high-frequency noise.

SUMMARY OF THE INVENTION

Therefore, an object of the present invention is to provide a magnetic printing machine able to obtain smooth gradation without using a high-frequency clock pulse.

According to this invention, in a magnetic printing machine including at least two recording frequency generators which generate at least two recording frequencies that are close, a recording current applied to a recording head for the same gradation level is switched among at least two recording frequencies every time a predetermined number of pixels are recorded.

BRIEF DESCRIPTION OF THE DRAWINGS

The present invention will be more clearly understood from the description set forth below with reference to the accompanying drawings.

DESCRIPTION OF THE PREFERRED EMBODIMENTS

Figure 1:
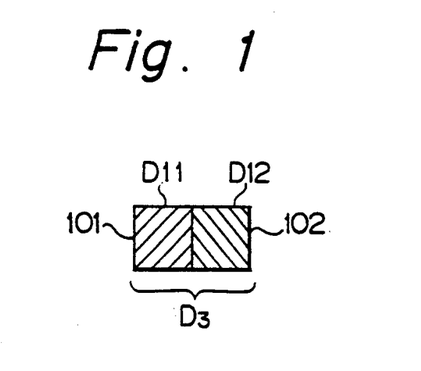
FIG. 1 is a conceptual drawing of a first recording method according to the first present invention.

FIG. 1 is a conceptual drawing of a first recording method according to the first present invention.

If two small pixels 101 and 102 that are neighbouring each other and should have the same gradation level $D_1$ are recorded respectively with two close gradation levels $D_{11}$ and $D_{12}$, two pixels 101 and 102 are recognized by the naked eyes as one pixel with a gradation level $D_3$ that is nearly equal to the average value between gradation levels $D_{11}$ and $D_{12}$.

In the Table 2, one preferred embodiment where two recording frequencies are used for recording two pixels that have the same original gradation level and switched to each other in accordance with whether a recording column number is even or odd is shown.

For example, one original pixel with gradation level 5 is recorded by using two recording pulse trains, that is, one pulse train for recording an even column has a 1.6 $\mu s$ period and the other for recording an odd column has a 1.9 $\mu s$ period respectively. Because two recorded pixels have 0.40 and 0.56 reflection density respectively, these are recognized as one pixel with 0.48 reflection density.

In the Table 2, new reflection density levels which are realized according to the present invention are shown by ⊙ mark. Further, $\gamma$-characteristic of this preferred embodiment is shown by o mark in FIG. 2.

In the recorded pixels, 16 gradation levels are realized corresponding to the original 16 gradation levels according to the present invention.

Figure 3:
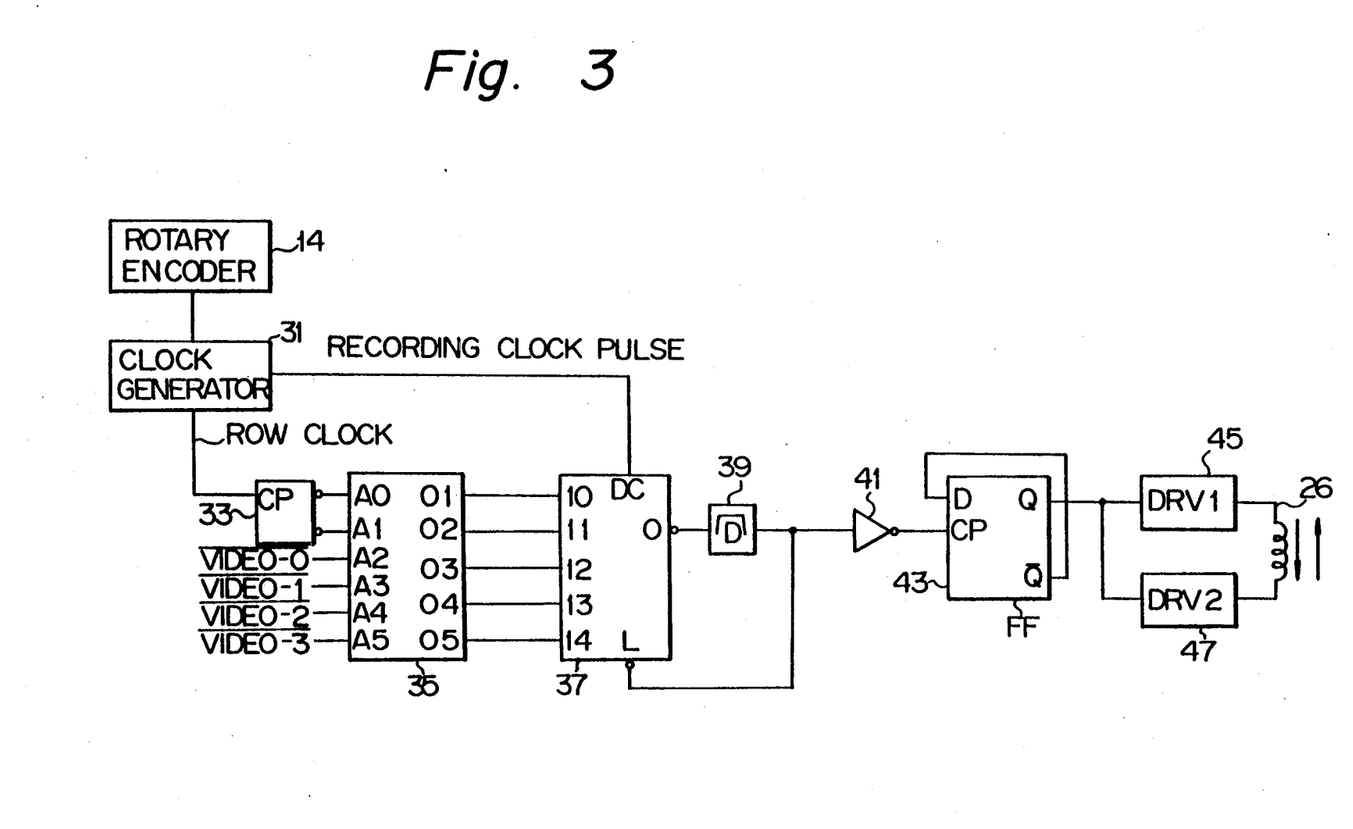
FIG. 3 is a diagram of a first frequency modulating circuit according to the first present invention.

FIG. 3 shows a diagram of a first frequency modulating circuit for the first recording method.

In this embodiment, the following circuits and functions are added to the conventional circuit shown in FIG. 8.

(1) The clock generator 31 generates row clock pulses in addition to the recording clock pulse.

(2) A row clock pulse counter 33 which counts the row clock pulses is arranged between the clock generator 31 and ROM 35.

(3) The plural kinds of data for determining the two recording frequencies corresponding to one original pixel are memoried in ROM 35.

When the row clock pulse counter 33 is functioned as a N-ary counter, N kinds of different addresses are applied to ROM 35, and N number of different areas in ROM 35 are accessed every N rows.

In a first area, first data determining first recording frequencies are memoried. In a second area, second data determining second recording frequencies are memoried and in a N-th area N-th data determining N-th recording frequencies are memoried.

The preferred embodiment shown in Table 2, corresponds to the case where the row clock pulse counter 33 functions as a binary counter.

As increasing the number N, the reflection density levels of the recorded pixels are increased.

If N=3, a first recording frequency which gives the reflection density 0.56 is selected for the first and second columns and a second recording frequency which gives the reflection density 0.74 is selected for the third column, these three pixels are recognized as one pixel with the reflection density $(0.56+0.56+0.74)/3=0.62$. This reflection density is a new reflection density not found in Table 2.

Figure 4:
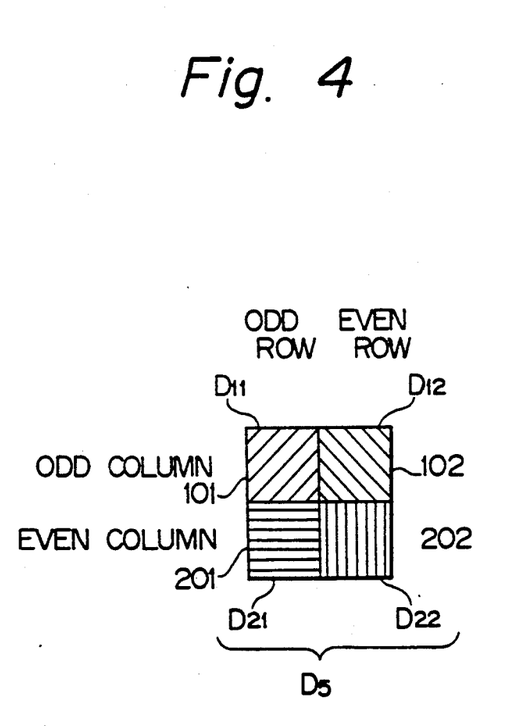
FIG. 4 is a conceptual drawing of a second recording method according to the second present invention.

FIG. 4 is a conceptual drawing of a second recording method according to the second present invention.

Four pixels 101, 102, 201 and 202 which are neighboring each other in a row and a column directions are recorded with four different frequencies which give four different levels of reflection density $D_{11}$, $D_{12}$, $D_{21}$ and $D_{22}$ corresponding to one original pixel with the same reflection density.

These four recorded pixels are recognized as one pixel with reflection density $D_5 \approx (D_{11}+D_{12}+D_{21}+D_{22})/4$.

Figure 5:
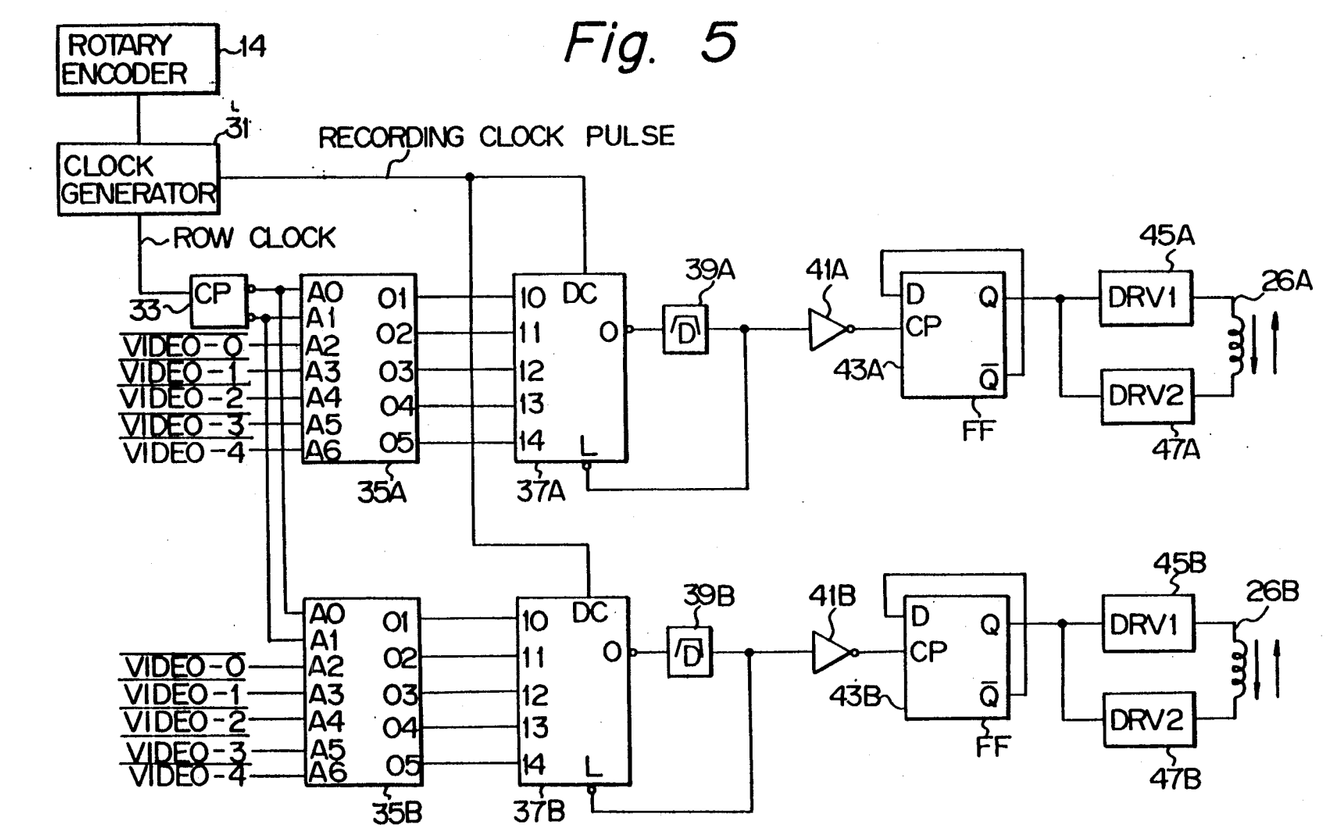
FIG. 5 is a diagram of a second frequency modulating circuit according to the second present invention.

FIG. 5 shows a diagram of a second frequency modulating circuit for the second recording method, and this method is applied when two rows are recorded simultaneously with at least two recording heads.

This circuit consists of at least two frequency circuits shown in FIG. 3 sharing one rotary encoder 14, clock-pulse generator 31 and row clock pulse counter.

When the row clock pulse counter 33 functions as the binary counter, a recording head 26A is used for recording an odd column, a recording head 26B is used for recording an even column and two groups of the different data are memoried respectively in ROM 35A and ROM 35B, four recorded pixels are recognized as one recorded pixel with an average gradation level between four recorded pixels.

Table 3 shows one example data for ROM 35A and ROM 35B, and reflection density of the recorded pixel.

Note, ⊙ means new levels of reflection density when applying the second recording method.

In this embodiment, input picture signal is 5 bit digital signal VIDEO 0–VIDEO 4 and original gradation levels are $2^5=32$. When 10 MHz recording frequency is selected, 32 gradation levels for recorded pixels are realized though only 9 gradation levels are obtained when using the conventional frequency modulating circuit.

If the two groups of data among the total four groups of data memoried in ROM 35A and 35B are the same, a new gradation level is produced by combining the three groups of data.

A characteristic of the second present invention is the use of different frequencies not only for two neighbouring pixels along a row direction but also for two neighbouring pixels along a column direction, and selecting at least three groups of data for determining a recording frequency.

Note, when the row clock pulse counter 33 is functioned as the N-ary counter and N groups of data are memoried in ROM, smoother gradation levels are obtained.

Figure 6:
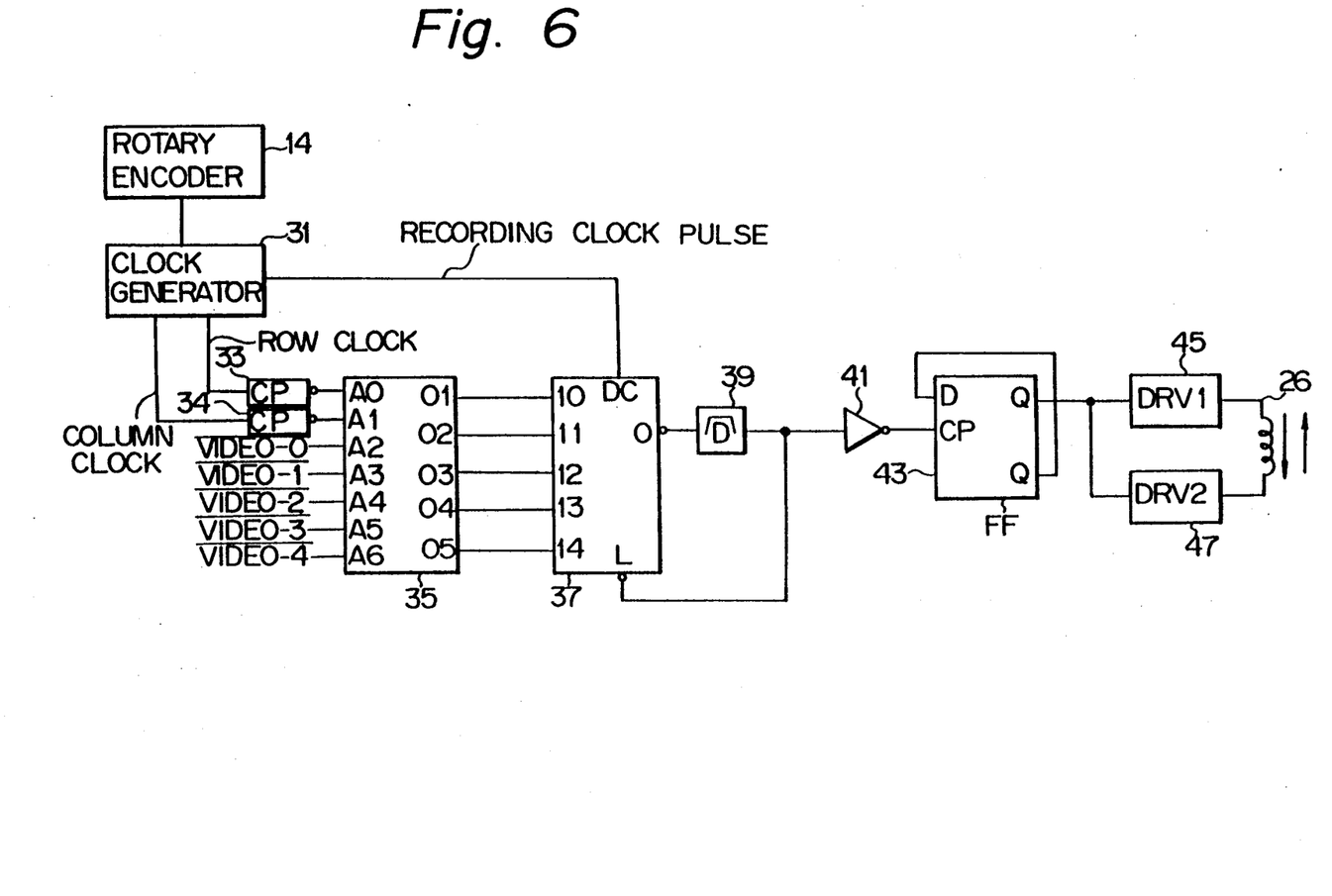
FIG. 6 is a diagram of another frequency modulating circuit according to the first present invention.

FIG. 6 shows a diagram of another frequency modulating circuit for the second present invention. In this case, a column clock pulse counter 34 is added so two different recording frequencies are applied for one recording head for every column.

Column clock pulses are generated from the clock-pulse generator 31 and counted in a column clock pulse counter 34. Its output is applied to the address terminal of ROM 35. If the column clock pulse counter functions as a binary counter, its output is inverted corresponding to whether a column is even or odd. In ROM 35 four groups of data shown in Table 3 are memoried.

In an area which is accessed when the column clock counter 34 denotes an even column, data shown as ROM 35A are memoried. On the other hand, in an area which is accessed when the column clock counter 34 denotes an odd column, data shown as ROM 35B are memoried.

By using this circuit, only one recording head is required for the second present invention. Even when the column and the row changes, different areas in ROM 35 are accessed.

Note, two groups of data among four groups of the data may be the same.

In the above embodiments, the closest two recording frequencies are coupled. But this coupling is only one example, it is obvious that two recording frequencies that are not closest to each other may be coupled. For example, the recording frequency which gives 0.24 reflection density and one which gives 0.74 may be coupled.

TABLE 1

| Brightness | Picture Signal Code | Initial Value | Reset Interval | Period of Recording Pulse Train | Reflection Density |
|---|---|---|---|---|---|
| White | 0 | 2 | 200 ns | 400 ns | 0.08 |
| ↓ | 1 | 3 | 300 | 600 | 0.08 |
| ↓ | 2 | 4 | 400 | 800 | 0.08 |
| ↓ | 3 | 5 | 500 | 1 $\mu s$ | 0.08 |
| ↓ | 4 | 6 | 600 | 1.2 | 0.08 |
| ↓ | 5 | 7 | 700 | 1.4 | 0.26 |
| ↓ | 6 | 8 | 800 | 1.6 | 0.40 |
| Gray | 7 | 9 | 900 | 1.8 | 0.56 |
| ↓ | 8 | 10 | 1 $\mu s$ | 2.0 | 0.74 |
| ↓ | 9 | 11 | 1.1 | 2.2 | 0.95 |
| ↓ | 10 | 12 | 1.2 | 2.4 | 1.14 |
| ↓ | 11 | 13 | 1.3 | 2.6 | 1.30 |
| ↓ | 12 | 14 | 1.4 | 2.8 | 1.38 |
| ↓ | 13 | 15 | 1.5 | 3.0 | 1.40 |
| ↓ | 14 | 16 | 1.6 | 3.2 | 1.40 |
| Black | 15 | 17 | 1.7 | 3.4 | 1.40 |

TABLE 2

| Brightness | Picture Signal Code | Initial Value Odd Row | Initial Value Even Row | Reflection Density Odd Row $D_{11}$ | Reflection Density Even Row $D_{12}$ | Average | Remarks |
|---|---|---|---|---|---|---|---|
| White | 0 | 2 | 2 | 0.08 | 0.08 | 0.08 | |
| | 1 | 2 | 7 | 0.08 | 0.24 | 0.16 | ○ |
| | 2 | 7 | 7 | 0.24 | 0.24 | 0.24 | |
| | 3 | 7 | 8 | 0.24 | 0.40 | 0.32 | ○ |
| | 4 | 8 | 8 | 0.40 | 0.40 | 0.40 | |
| | 5 | 8 | 9 | 0.40 | 0.56 | 0.48 | ○ |
| | 6 | 9 | 9 | 0.56 | 0.56 | 0.56 | |
| Gray | 7 | 9 | 10 | 0.56 | 0.74 | 0.65 | ○ |
| | | 10 | 10 | 0.74 | 0.74 | | |
| | 9 | 10 | 11 | 0.74 | 0.95 | 0.85 | ○ |
| | 10 | 11 | 11 | 0.95 | 0.95 | 0.95 | |
| | 11 | 11 | 12 | 0.95 | 1.14 | 1.04 | ○ |
| | 12 | 12 | 12 | 1.14 | 1.14 | 1.14 | |
| | 13 | 12 | 13 | 1.14 | 1.30 | 1.22 | ○ |
| | 14 | 13 | 13 | 1.30 | 1.30 | 1.30 | |
| Black | 15 | 17 | 17 | 1.40 | 1.40 | 1.40 | |

TABLE 3

| Brightness | Picture Signal Code | ROM 35A Odd Column Odd Row | ROM 35A Odd Column Even Row | ROM 35B Even Column Odd Row | ROM 35B Even Column Even Row | Reflection Density $D_{11}$ | $D_{12}$ | $D_{21}$ | $D_{22}$ | $D_5$ | Remarks |
|---|---|---|---|---|---|---|---|---|---|---|---|
| White | 0 | 2 | 2 | 2 | 2 | 0.08 | 0.08 | 0.08 | 0.08 | 0.08 | |
| | 1 | 2 | 2 | 2 | 7 | 0.08 | 0.08 | 0.08 | 0.24 | 0.12 | ◉ |
| | 2 | 2 | 2 | 7 | 7 | 0.08 | 0.08 | 0.24 | 0.24 | 0.16 | |
| | 3 | 2 | 7 | 7 | 7 | 0.08 | 0.24 | 0.24 | 0.24 | 0.20 | ◉ |
| | 4 | 7 | 7 | 7 | 7 | 0.08 | 0.24 | 0.24 | 0.24 | 0.24 | |
| | 5 | 7 | 7 | 7 | 8 | 0.24 | 0.24 | 0.24 | 0.40 | 0.28 | ◉ |
| | 6 | 7 | 7 | 8 | 8 | 0.24 | 0.40 | 0.40 | 0.40 | 0.32 | |
| | 7 | 7 | 8 | 8 | 8 | 0.24 | 0.40 | 0.40 | 0.40 | 0.36 | ◉ |
| | 8 | 8 | 8 | 8 | 8 | 0.24 | 0.40 | 0.40 | 0.40 | 0.40 | |
| | 9 | 8 | 8 | 8 | 9 | 0.40 | 0.40 | 0.40 | 0.56 | 0.44 | ◉ |
| | 10 | 8 | 8 | 9 | 9 | 0.40 | 0.56 | 0.56 | 0.56 | 0.48 | |
| | 11 | 8 | 9 | 9 | 9 | 0.40 | 0.56 | 0.56 | 0.56 | 0.52 | ◉ |
| | 12 | 9 | 9 | 9 | 9 | 0.40 | 0.56 | 0.56 | 0.56 | 0.56 | |
| | 13 | 9 | 9 | 9 | 10 | 0.56 | 0.56 | 0.56 | 0.74 | 61 | ◉ |
| | 14 | 9 | 9 | 10 | 10 | 0.56 | 0.74 | 0.74 | 0.74 | 0.65 | |
| Gray | 15 | 9 | 10 | 10 | 10 | 0.56 0.56 | | 0.74 | 0.74 | 0.70 | |

TABLE 3-continued

| Brightness | Picture Signal Code | ROM 35A Odd Column Odd Row | ROM 35A Odd Column Even Row | ROM 35B Even Column Odd Row | ROM 35B Even Column Even Row | $D_{11}$ | $D_{12}$ | $D_{21}$ | $D_{22}$ | $D_5$ | Remarks |
|---|---|---|---|---|---|---|---|---|---|---|---|
| | 16 | 10 | 10 | 10 | 10 | 0.74 | 0.74 | 0.74 | 0.74 | 0.74 | |
| | 17 | 10 | 10 | 10 | 11 | 0.74 | 0.74 | 0.74 | 0.95 | 0.79 | ◎ |
| | 18 | 10 | 10 | 11 | 11 | 0.74 | 0.74 | 0.95 | 0.95 | 0.85 | |
| | 19 | 10 | 11 | 11 | 11 | 0.95 | 0.74 | 0.95 | 0.95 | 0.90 | ◎ |
| | 20 | 11 | 11 | 11 | 11 | 0.95 | 0.95 | 0.95 | 0.95 | 0.95 | |
| | 21 | 11 | 11 | 11 | 12 | 0.95 | 0.95 | 0.95 | 1.14 | 1.00 | ◎ |
| | 22 | 11 | 11 | 12 | 12 | 0.95 | 0.95 | 1.14 | 1.14 | 1.04 | |
| | 23 | 11 | 12 | 12 | 12 | 1.14 | 0.95 | 1.14 | 1.14 | 1.18 | ◎ |
| | 24 | 12 | 12 | 12 | 12 | 1.14 | 1.14 | 1.14 | 1.14 | 1.22 | |
| | 25 | 12 | 12 | 12 | 13 | 1.14 | 1.14 | 1.14 | 1.30 | 1.26 | ◎ |
| | 26 | 12 | 12 | 13 | 13 | 1.14 | 1.14 | 1.30 | 1.30 | 1.30 | |
| | 27 | 12 | 13 | 13 | 13 | 1.30 | 1.14 | 1.30 | 1.30 | 1.35 | ◎ |
| | 28 | 13 | 13 | 13 | 13 | 1.30 | 1.30 | 1.30 | 1.30 | 1.38 | |
| | 29 | 13 | 13 | 14 | 14 | 1.30 | 1.30 | 1.40 | 1.40 | | ◎ |
| | 30 | 13 | 14 | 14 | 14 | 1.30 1.40 | 1.40 | 1.40 | | | ◎ |
| Black | 31 | 14 | 14 | 14 | 14 | 1.40 | 1.40 | 1.40 | 1.40 | 1.40 | |

I claim:

1. A method of recording a magnetic printing machine which records an image on a recording drum with one recording head, comprising the steps of:
   determining a first recording frequency based on a digital signal that represents a certain gradation level of an original pixel;
   determining a second recording frequency which is close to said first recording frequency based on said digital signal; and
   switching a recording frequency from said first recording frequency to said second recording frequency, or vice versa, at every time when a predetermined number of pixels have been recorded.

2. A method of recording for a magnetic printing machine which records an image on a recording drum with one recording head, comprising steps of:
   determining a first frequency demand based on a digital signal which represents a certain gradation level of an original pixel;
   determining a second frequency demand which is close to said first frequency demand based on a digital signal which represents the same gradation level as said original pixel;
   generating clock pulses synchronizing with rotational speed of a recording drum;
   generating a switching signal every time said clock pulses are counted to a predetermined number;
   switching a recording frequency which is determined from said first frequency demand or said second frequency demand every time said switching signal is generated;
   generating recording pulse train a frequency thereof is determined in accordance with said recording frequency;
   amplifying said recording pulse train with a power amplifier; and
   recording said amplified recording pulse train on said recording drum.

3. An apparatus for recording magnetically an image on a recording drum with one recording head, comprising:
   means for determining a first frequency demand based on a digital signal which represents a certain gradation level of an original pixel;
   means for determining a second frequency demand which is close to said first frequency demand based on a digital signal which represents the same gradation level as said original pixel;
   means for generating clock pulses synchronizing with rotational speed of a recording drum;
   means for generating a switching signal every time said clock pulses are counted to a predetermined number;
   means for switching a recording frequency determined from said first frequency demand or said second frequency demand every time said switching signal is generated;
   means for generating recording pulse train a frequency thereof is determined in accordance with said recording frequency;
   means for amplifying said recording pulse train with a power amplifier; and
   means for recording said amplified recording pulse train on said recording drum.

4. A method as set forth in claim 1, wherein said recording frequency selecting step comprises a step of:
   switching a recording frequency selected among at least three kinds of recording frequencies which are said first recording frequency, said second recording frequency and a third recording frequency which is close to said first recording frequency and said second recording frequency corresponding to the same gradation level as said original pixel, every time a predetermined number of pixels are recorded.

5. A method as set forth in claim 2 for a magnetic printing machine with at least two recording heads arranged parallel along an axis of said recording drum, further comprising steps of:
   determining a third frequency demand which is close to said first frequency demand and said frequency demand based on a digital signal which represents the same gradation level as said original pixel;
   switching a first recording frequency applied to first recording head among said at least two recording heads determined by any one of said first frequency demand, said second frequency demand and said third frequency demand every time said switching signal is generated;

switching a second recording frequency applied to second recording head among said at least two recording heads determined by any one of said first frequency demand, said second frequency demand and said third frequency demand every time said switching signal is generated;

generating first recording pulse train a frequency thereof is determined in accordance with said first recording frequency;

generating second recording pulse train a frequency thereof is determined in accordance with said second recording frequency;

amplifying said first recording pulse train with a first power amplifier;

amplifying said second recording pulse train with a second power amplifier; and recording said first and second amplified recording pulse trains with said at least two recording heads on said recording drum.

6. An apparatus as set forth in claim 3 with at least two recording heads arranged parallel along an axis of said recording drum, further comprising means of:

means for determining a third frequency demand close to said first frequency demand and said frequency demand based on a digital signal which represents the same gradation level as said original pixel;

means for switching a first recording frequency applied to first recording head among said at least two recording heads determined by any one of said first frequency demand, said second frequency demand and said third frequency demand every time said switching signal is generated;

means for switching a second recording frequency applied to second recording head among said at least two recording heads determined by any one of said first frequency demand, said second frequency demand and said third frequency demand every time said switching signal is generated;

means for generating first recording pulse train a frequency thereof is determined in accordance with said first recording frequency;

means for generating second recording pulse train a frequency thereof is determined in accordance with said second recording frequency;

means for amplifying said first recording pulse train with a first power amplifier;

means for amplifying said second recording pulse train with a second power amplifier; and means for recording said first and second amplified recording pulse trains with said at least two recording heads on said recording drum.

* * * * *